United States Patent [19]

Dingfors et al.

[11] 4,431,542

[45] Feb. 14, 1984

[54] FILTER AND METHOD OF PRODUCING THE SAME

[75] Inventors: Kent Dingfors, Upplands Väsby; Christer Heinegard, Karlskoga, both of Sweden

[73] Assignee: Aktiebolaget Bofors, Bofors, Sweden

[21] Appl. No.: 384,830

[22] Filed: Jun. 4, 1982

[30] Foreign Application Priority Data

Jun. 4, 1981 [SE] Sweden ............................. 81035164

[51] Int. Cl.$^3$ ............................................. B01D 39/18
[52] U.S. Cl. .................................. 210/502.1; 55/524; 55/528; 210/505
[58] Field of Search ......................... 55/524, 527, 528; 210/505, 508, 502; 521/29; 162/123

[56] References Cited

U.S. PATENT DOCUMENTS

| | | | |
|---|---|---|---|
| 2,955,067 | 10/1960 | McBurney et al. | 210/505 |
| 3,003,643 | 10/1961 | Thomas | 210/505 |
| 3,839,143 | 10/1974 | Suckow | 162/123 |
| 3,944,485 | 3/1976 | Rembaum et al | 521/29 |

*Primary Examiner*—Ivars C. Cintins
*Attorney, Agent, or Firm*—Pollock, Vande Sande & Priddy

[57] ABSTRACT

The invention deals with a filter for gas or liquid separation. The filter consists of a continuous fiber tissue within which a granular or powder formed (particle formed) activated material is contained (fixed). The activated material shall have the ability to absorb or chemically bind specific gas or liquid formed components. The fibre tissue is in itself sufficently porous to permit the said gas or liquid components to diffuse in through the same, while at the same time being sufficiently compact to keep the activated particle formed material fixed.

The filter is primarily intended to be used in such a way that the flow of gas or liquid to be purified passes the fibre tissue in thin layers whereupon the relevant components can diffuse in through the pores of the fibre tissue in order to be bound or absorbed in the particle formed material.

15 Claims, No Drawings

FILTER AND METHOD OF PRODUCING THE SAME

This invention relates to a filter for the separation of gases or liquids and consists of a continuous fibre tissue the active function of which is based on its ability to chemically bind or physically absorb gas or liquid formed components of previously determined type.

Characteristic for the filter according to the invention is that its ability to absorb gas and/or liquid formed components is limited to powder or particle formed material contained in the fibre tissue. The fibre tissue must therefore be able to allow the through passage of those fluids (gas or liquid components) which are desired to be absorbed in the filter. On the other hand it is neither necessary or in most cases desirable to allow all of the fluid flow from which the said components are to be absorbed to pass through the fibre tissue. On condition that the particle formed active material contained in the fibre tissue has an adequate affinity to the components to be absorbed, it is sufficient to cause the fluid flow to run in a sufficiently thin layer along the length of the fibre tissue. In this context a suitable rate of flow and length of contact surface between the fluid and the active fibre tissue should be chosen. The advantage gained by leading the flow of fluid along instead of through a filter of the type described in the invention is of course that in this way a considerably smaller drop in pressure over the filter is obtained. The principal of forcing the flow of fluid to be treated along the length of a fibre tissue which is a carrier of particles for the treatment of a fluid is in itself known e.g. in Swedish Pat. No. 363.241. However in that case the filter active component consists of particles glued in a layer of resin on the surface of the fibre tissue which means that only those parts of the particles which protrude above the layer of resin are available for reaction with the passing fluid flow. On the other hand the said patent describes how by attaching partly folded fibre tissues to a laminated filter body one can produce a filter containing a very large quantity of separate in relation to each other parallel channels for the fluid to be treated. This type of filter can even be used in this context.

The filter according to the invention is primarily intended to separate gaseous impurities from air, but it can also be used for various types of gas separation. If the fibre tissue which acts as the filter base fulfils special requirements on insensitivity to wettiing it is even possible to use the filter for separation of specific components from liquids.

As previously mentioned the technique according to the invention is based on the fact that those components to be separated from a flow of fluid are brought into contact with an absorbant material bound in the filter for the absorption of the said components. The preferred and according to the invention described absorbant material is primarily porous polymer particles of a specific type.

Simultaneously greater or smaller quantities of other particle formed materials having the ability to absorb relevant gases and/or liquids can be included, e.g., in the form of powder or activated carbon.

In this case the relevant polymer particles are primarily of the type which can by generally designated as macroporous polymers and possibly complemented by functional groups. The designation functional group is the accepted designation within the field of organic chemistry and as such need not be defined closer. In this context the purpose of the functional groups is to provide the particle formed material (macroporous polymers) with the desired affinity to the individual relevant component to be absorbed or chemically bound in the macroporous polymer.

By macroporous polymer is meant a particle formed polymer material which in a dry state has a permanent porosity which gives an available specific surface greater than 50 $m^2/g$. The fact that macroporous polymers as a rule consist of relatively fine particled materials has really nothing to do with the definition as it is the porosity of the particles and not their granular size which gives macroporous polymers their great available specific surface for reaction with gaseous media. These macroporous polymers can therefore be regarded as being more or less independent of the mean diameter of the particles. At present the method of producing macroporous polymers having a particle size of from approximately 0,01 mm up to several millimeters in diameter is already known.

One method of producing macroporous polymers containing functional groups is described in Swedish Patent Application No. 81.00536-5. As this is not an integral part of this invention it will not be further described how together with this invention this extremely useful product is produced.

Swedish Patent Application No. 81.00537-3 describes how various macroporous polymers can be utilized for the separation of gases or liquids. In this context one extremely great advantage with macroporous polymers is that they are very easy to reactivate and this can be carried out an almost unlimited number of times without their absorbancy deteriorating.

Generally speaking macroporous polymers can therefore be used for the absorption or chemical binding of specific components contained in gases or in certain liquids. The aforesaid being true on condition that the macroporous polymer has a good affinity to the relevant gas or liquid component. This affinity can be achieved by the incorporation of functional groups. The frequently small size of the macroporous polymer particles can cause certain problems. By arranging these particles in a firm bed and allowing the flow of fluid to be treated to run through the bed can for example be unsuitable due to too great a drop in pressure over a filter constructed in this way. In other cases the small particle size can make impossible the use of fluid bed type filters. The disadvantages with filters of the type which involve the surface gluing of particle formed active material on to a carrier material have already been dealt with.

In accordance with the basic idea behind the invention the active particles are fixed in a fibre tissue which is sufficiently porous to allow the relevant gas or liquid components to diffuse in the said particles even when they are fixed in the central parts of the tissue or away from them when reactivating the filter. By the expression fixed in the tissue is meant that the particles are contained in the fibre tissue. In this way a very easily handled filter is obtained.

According to the invention paper or other cellulose fibre based products are preferably utilized to bind up the active absorbant particles, but greater or smaller mixtures of other types such as mineral fibres, artificial fibres or similar may also be used or even cellulose-free fibre tissues of for example non-woven type i.e. pure synthetic fibres may be used.

The fact that paper has been shown to be so suitable for this purpose is due primarily to that in spite of having a suitably porous and open structure it has been shown to be able to bind up the relevant particles most satisfactorily.

The methods described above and below allow more than 60% by weight of polymers to be bound up in the paper.

The invention also includes several clearly defined ways of producing the filter according to the invention.

The macropprous polymers can in this way be mixed into a sheet of carrier fibre for example paper, by being mixed in the paper pulp prior to consolidation of the sheet of fibre. It is even possible to impregnate a finished sheet of fibre with a suspension of various particles having a very small mean diameter. It is also fully possible to manufacture multi-layered paper where one or several of the middle layers consist wholly or partially of the relevant particles. For reasons of strength the mixing in of fibres in relatively pure layers of particles may be motivated.

The filter according to the invention is functionally independent of the way in which the active particles are contained in the fibre tissue but is controlled by their ability to allow the passage of the relevant gases and/or liquids in to the particles.

A suitable method of producing a filter according to the invention where the porous polymer particles are concentrated in the middle layer, is to introduce a suspension of polymer particles and fibres as an intermediate layer during the manufacture of a multi-layer fibre tissue. This can be carried out either by introducing the said suspension between two partly dried fibre tissues in a double wire section paper machine or by introducing the said suspension via an intermediate section in an inlet box to be incorporated in the fibre tissue during its formation.

In order to ascertain to what extent incorporation in the fibre had affected the absorption capacity of a relevant polymer material, a test filter was manufactured on a single wire section paper machine having a triple sectioned inlet box. A dispersion of 17 parts by weight cellulose fibres was fed in to the outer section of the inlet box and 43 parts by weight polymer particles (macroporous polymers) were fed in to the centre section.

After drying the fibre tissue obtaiined had a surface weight of 77 g/m$^2$ and it contained 60% by weight polymer particles. Absorption tests on this filter showed that the polymer absorption capacity per unit of weight was the same as for free form polymer particles.

This result must mean that entire surface of the macroporous polymer particles is available for absorption even when the particles are contained in the paper tissue. As previously stated this does not apply to filters of the type described in Swedish Patent 363.241 where the active particles are glued in a layer of resin on the filter surface.

This invention is defined in the Patent Claims which follow. Filters produced as described above have been shown to be extremely suitable for the absorption of one or more gases from air or other gas mixtures.

In this context examples of particularly relevant materials are solvents, aromatics, monomers, aliphatic and polar compounds. The previously mentioned fact that the filter is very easy to reactivate means that absorbed substances are easy to recycle while the filter may be used repeatedly.

We claim:

1. A method for producing a filter for gas or liquid separations wherein said filter is easy to reactivate and is a continuous fiber tissue containing greater than 50% by weight of cellulose fibers which bears an activated particle formed material capable of physically absorbing or chemically binding predetermined gas or liquid components and which comprises forming said fiber tissue on the wire section of a paper forming machine employing a multi-sectioned inlet box, and mainly, adding the particle formed material to said wire section via the center section or sections of said inlet box to thereby form a multi-layered pulp tissue wherein the main part of the particle formed material is concentrated in the center layer or layers thereof; and wherein said particle formed material is a macroporous polymer of a crosslinked homopolymer or copolymer having a specific surface greater than 50 m$^2$/g.

2. The method of claim 1 wherein the porosity of said fiber tissue is sufficient to permit the predetermined gas or liquid components to diffuse to the particle formed material.

3. The method of claim 1 wherein said cellulose is paper.

4. The method of claim 1 wherein said filter contains more than 60% by weight of said particle formed material.

5. The method of claim 1 wherein said filter is for gas separation.

6. The method of claim 1 wherein the diameter of said macroporous polymer is at least 0.01 mm.

7. A method for producing a filter for gas or liquid separation wherein said filter is easy to reactivate and is a continuous fiber tissue which bears an activated particle formed material capable of physically absorbing or chemically binding predetermined gas or liquid components which comprises adding particle formed material as a suspension between two partially dried fiber tissues in a double wire section paper forming machine wherein said particle formed material is a macroporous polymer of an aromatic homopolymer or copolymer having a specific surface greater than 50 m$^2$/g.

8. The method of claim 7 wherein the porosity of said fiber tissue is sufficient to permit the predetermined gas or liquid components to diffuse to said particle formed material.

9. The method of claim 7 wherein said fiber tissue contains cellulose fibers.

10. The method of claim 7 wherein said fiber tissue contains more than 50% by weight of cellulose fibers.

11. The method of claim 7 wherein said cellulose is paper.

12. The method of claim 7 wherein said filter contains more than 60% by weight of said particle formed material.

13. The method of claim 7 wherein said suspension is a water suspension.

14. The method of claim 7 wherein said filter is for gas separation.

15. The method of claim 7 wherein the diameter of said macroporous polymers is at least about 0.01 mm.

* * * * *